(12) United States Patent
Panje et al.

(10) Patent No.: US 9,832,525 B2
(45) Date of Patent: Nov. 28, 2017

(54) SET-TOP DISK HEALTH DIAGNOSTICS

(71) Applicant: ARRIS Enterprises, Inc., Suwanee, GA (US)

(72) Inventors: Krishna Prasad Panje, Bangalore (IN); Yeqing Wang, Horsham, PA (US); David Harold Grant, Doylestown, PA (US); Archan Kooli, Bangalore (IN); Virendra Singh, Bangalore (IN); Lakshmi Arunkumar, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 43 days.

(21) Appl. No.: 14/881,344

(22) Filed: Oct. 13, 2015

(65) Prior Publication Data

US 2016/0105715 A1    Apr. 14, 2016

Related U.S. Application Data

(60) Provisional application No. 62/063,083, filed on Oct. 13, 2014.

(51) Int. Cl.
*H04N 21/442* (2011.01)
*H04N 21/4425* (2011.01)
(Continued)

(52) U.S. Cl.
CPC ....... *H04N 21/4425* (2013.01); *H04N 17/004* (2013.01); *H04N 21/4424* (2013.01);
(Continued)

(58) Field of Classification Search
CPC .. H04N 1/00002; H04N 17/04; H04N 17/045; H04N 17/06; H04N 5/76; H04N 21/4424
See application file for complete search history.

(56) References Cited

U.S. PATENT DOCUMENTS

| 2006/0010233 A1* | 1/2006 | Fellenstein | G06F 11/3414 709/224 |
| 2006/0064527 A1* | 3/2006 | Fisher | G06F 11/0727 710/200 |

(Continued)

OTHER PUBLICATIONS

Stevens, Curtis E., Information Technology—AT Attachment 8—ATA/ATAPI Command Set (ATA8-ACS), American National Standard of Accredited Standards Committee INCITS, May 21, 2007, Revision 4a, American National Standards Institute.

(Continued)

*Primary Examiner* — Nicholas Corbo
(74) *Attorney, Agent, or Firm* — Bart A. Perkins (57) ABSTRACT

Methods, systems, and computer readable media can be operable to monitor for and alert the occurrence of pre-failure indicators at a set-top box (STB) disk. Results of self-monitoring tests, short tests, and maximum/minimum performance tests may be used to identify the potential for a STB disk failure. Moreover, critical error events at the STB may be logged, and the health of the STB disk may be determined based on the logged critical error events. Test results and critical error event logs may be used to predict an impending failure of a STB disk, and a notification may be output to a user or technician indicating the potential need to replace the STB or STB disk.

19 Claims, 8 Drawing Sheets

(51) Int. Cl.
   *H04N 21/488*   (2011.01)
   *H04N 17/00*    (2006.01)
   *H04N 21/258*   (2011.01)
   *H04N 17/04*    (2006.01)
   *H04N 1/00*     (2006.01)
   *H04N 5/76*     (2006.01)
   *H04N 17/06*    (2006.01)

(52) U.S. Cl.
   CPC ..... *H04N 21/4882* (2013.01); *H04N 1/00002* (2013.01); *H04N 5/76* (2013.01); *H04N 17/04* (2013.01); *H04N 17/045* (2013.01); *H04N 17/06* (2013.01); *H04N 21/25808* (2013.01)

(56) References Cited

U.S. PATENT DOCUMENTS

| | | | | |
|---|---|---|---|---|
| 2007/0011417 A1* | 1/2007 | Sicola | ............. | G06F 3/0605 711/162 |
| 2008/0109862 A1* | 5/2008 | Jost | ............. | H04N 7/173 725/107 |
| 2010/0011406 A1* | 1/2010 | Lin | ............. | H04N 17/004 725/134 |
| 2011/0066803 A1* | 3/2011 | Arakawa | ............. | G06F 11/1088 711/114 |
| 2013/0142499 A1* | 6/2013 | Major | ............. | H04N 21/234363 386/341 |
| 2014/0165116 A1* | 6/2014 | Major | ............. | G06F 21/6218 725/89 |
| 2014/0310574 A1* | 10/2014 | Yu | ............. | G06F 11/1072 714/773 |

OTHER PUBLICATIONS

Pinheiro, Edward, et al., "Failure Trends in a Large Disk Drive Population", Appears in the Proceedings of the 5th USENIX Conference on File and Storage Technologies (FAST'07), Feb. 2007.

* cited by examiner

SET-TOP DISK HEALTH DIAGNOSTICS

CROSS REFERENCE TO RELATED APPLICATION

This application is a non-provisional application claiming the benefit of U.S. Provisional Application Ser. No. 62/063,083, entitled "Pre-Failure Alert for Set-Top Disk," which was filed on Oct. 13, 2014, and is incorporated herein by reference in its entirety.

TECHNICAL FIELD

This disclosure relates to set-top disk health diagnostics and tests.

BACKGROUND

Set-top boxes (STB) with an internal disk (e.g., hard disk drive (HDD)) may fail at any time without providing a warning to a subscriber, thus subscribers are at risk of losing recorded content and digital video recorder (DVR) functionality until the STB or associated disk can be replaced. Therefore, it would be advantageous if a subscriber either directly or through a multiple systems operator (MSO) is warned of an impending failure of the disk associated with a STB. Further, when a STB enters a repair center, it would be beneficial for technicians to have the ability to conduct a quick evaluation of disk health to check whether the disk is healthy enough to be deployed to perform a specific use case.

Currently, self-monitoring technology is used in STBs as one major tool to predict disk failures. However, not all self-monitoring attributes are clear indicators of an imminent disk failure, and the presence or absence of pre-failure attributes at a STB has not provided an accurate mechanism for predicting disk failures. Moreover, STBs are used differently by different users, and different types of STBs are configured with different capabilities. Therefore, there is a need for a disk testing procedure that may be customized per device and per user.

BRIEF DESCRIPTION OF THE DRAWINGS

Like reference numbers and designations in the various drawings indicate like elements.

DETAILED DESCRIPTION

It is desirable to improve upon methods and systems operable to identify the potential for a set-top box (STB) disk failure. Methods, systems, and computer readable media can be operable to monitor for and alert the occurrence of pre-failure indicators at a STB disk. Results of self-monitoring tests, short tests, and maximum/minimum performance tests may be used to identify the potential for a STB disk failure. Moreover, critical error events at the STB may be logged, and the health of the STB disk may be determined based on the logged critical error events. Test results and critical error event logs may be used to predict an impending failure of a STB disk, and a notification may be output to a user or technician indicating the potential need to replace the STB or STB disk.

STB diagnostics may include a method comprising the steps of: (1) periodically (e.g., whenever the STB comes out of standby mode) running a self-diagnostic parameter check of specified pre-failure attributes, (2) storing critical disk event errors in the STB disk, (3) sending key pre-failure data to a remote server when requested by repair center personnel or periodically, and (4) running a test to qualify the disk for a specific use-case (e.g., digital video recorder (DVR) usage). For example, a sequence of tests for qualifying a disk (e.g., hard disk drive (HDD)) for DVR usage might include the steps of: (1) interpreting critical self-diagnostic test failure(s), (2) running and interpreting a short test, (3) interpreting previously logged disk events (e.g., flagging the disk as bad based on critical disk events being present), and (4) conducting a minimum and/or maximum read/write performance test as per product supported use case to qualify a disk within the STB.

In embodiments, disk events may be continuously logged by a STB. These events may include critical read/write/integrated drive electronics (IDE) events as described herein. These disk event occurrences may indicate that the STB is experiencing playback/record issues with respect to the disk. Logs including information associated with the critical read/write/IDE events may be output (e.g., through a serial port command) for use by repair personnel. Unique tests may be run depending on support required by a specific use case of the STB. For example, support may be measured based on throughput at the STB disk (e.g., maximum read/write throughput).

The testing sequences described herein enable the identification of a STB disk as a failing disk based on attributes that are customized or that are unique to the subject STB. For example, self-diagnostic test results, coupled with the presence or absence of critical error events may not provide a certain indication of the health of a STB disk. However, a minimum performance test that is tailored to the specific use-case of a STB may provide a clear indication of STB disk health. Moreover, a minimum performance test may enable the qualification of a STB disk for a certain use-case deployment.

An embodiment of the invention described herein may include a method comprising: (a) determining a number of simulation operations to perform on a set-top box disk, wherein the number of simulation operations is based on one or more capabilities of the set-top box disk; (b) determining a bitrate at which to perform each of the simulation operations, wherein the bitrate at which to perform each of the simulation operations is based on one or more capabilities of the set-top box disk; (c) performing the simulation operations on the set-top box disk at the determined bitrate; (d) monitoring one or more components of a set-top box associated with the set-top box disk for critical errors; and (e) if one or more critical errors are observed at the set-top box while the simulation operations are being performed on the set-top box disk, outputting a notification indicating the need for replacement of the set-top box disk.

According to an embodiment of the invention, the number of simulation operations performed on the set-top box disk is based on the number of read operations and write operations for which the set-top box disk is configured to simultaneously perform.

According to an embodiment of the invention, the method described herein further comprises: (a) determining a maximum number of simultaneous read operations and write operations that are performed on the set-top box disk over a certain period of time; and (b) wherein the number of simulation operations performed on the set-top box disk is based on the determined maximum number of simultaneous read operations and write operations performed on the set-top box disk over the certain period of time.

According to an embodiment of the invention, the method described herein further comprises: (a) determining an average number of simultaneous read operations and write operations that are performed on the set-top box disk over a certain period of time; and (b) wherein the number of simulation operations performed on the set-top box disk is based on the determined average number of simultaneous read operations and write operations performed on the set-top box disk over the certain period of time.

According to an embodiment of the invention, the bitrate at which each respective simulation operation is performed on the set-top box disk is based on an average bitrate associated with read or write operations.

According to an embodiment of the invention, the simulation operations are performed at a significant distribution of points throughout the set-top box disk.

According to an embodiment of the invention, the simulation operations are performed on the set-top box disk using non-data-destructive testing.

According to an embodiment of the invention, the notification comprises a log of the identified critical errors, and wherein the notification is output from the set-top box to a remote server.

According to an embodiment of the invention, one or more observed critical errors comprise buffer interruptions.

An embodiment of the invention described herein may include an apparatus comprising: (a) a module configured to: (i) determine a number of simulation operations to perform on a disk, wherein the number of simulation operations is based on read and write capabilities of the disk; (ii) determine a bitrate at which to perform each of the simulation operations; (iii) perform the simulation operations on the disk at the determined bitrate; and (iv) monitor the disk for critical errors; and (b) an interface configured to be used to output a notification indicating the need for replacement of the disk if one or more critical errors are observed while the simulation operations are being performed on the disk.

According to an embodiment of the invention, the number of simulation operations performed on the disk is based on the number of read operations and write operations for which the disk is configured to simultaneously perform.

According to an embodiment of the invention, the module is further configured to: (a) determine a maximum number of simultaneous read operations and write operations that are performed on the disk over a certain period of time; and (b) wherein the number of simulation operations performed on the disk is based on the determined maximum number of simultaneous read operations and write operations performed on the disk over the certain period of time.

According to an embodiment of the invention, the module is further configured to: (a) determine an average number of simultaneous read operations and write operations that are performed on the disk over a certain period of time; and (b) wherein the number of simulation operations performed on the disk is based on the determined average number of simultaneous read operations and write operations performed on the disk over the certain period of time.

An embodiment of the invention described herein may include a method comprising: (a) running one or more self-monitoring tests on a set-top box disk; (b) logging the occurrence of critical disk errors at the set-top box disk; (c) running one or more use-case specific tests on the set-top box disk, wherein the one or more use-case specific tests are based on a use of the set-top box; and (d) based on the results of the self-monitoring tests, the occurrence of critical disk errors, and the results of the one or more use-case specific tests, outputting a notification indicating the need for replacement of the set-top box disk.

According to an embodiment of the invention, the method described herein further comprises: (a) monitoring throughput at the set-top box disk for a first predetermined period; (b) determining an average throughput for the first predetermined period; (c) monitoring throughput at the set-top box disk for a second predetermined period; (d) determining an average throughput for the second predetermined period; and (e) if the average throughput for the second predetermined period is less than the average throughput for the first predetermined period by a predetermined threshold, outputting a notification identifying the set-top box disk as a disk that is trending toward a failure.

According to an embodiment of the invention, the average throughput for the first predetermined period and the average throughput for the second predetermined period comprises the average maximum throughput observed during each respective period.

According to an embodiment of the invention, the first predetermined period and the second predetermined period are of equivalent durations.

Figure 1:
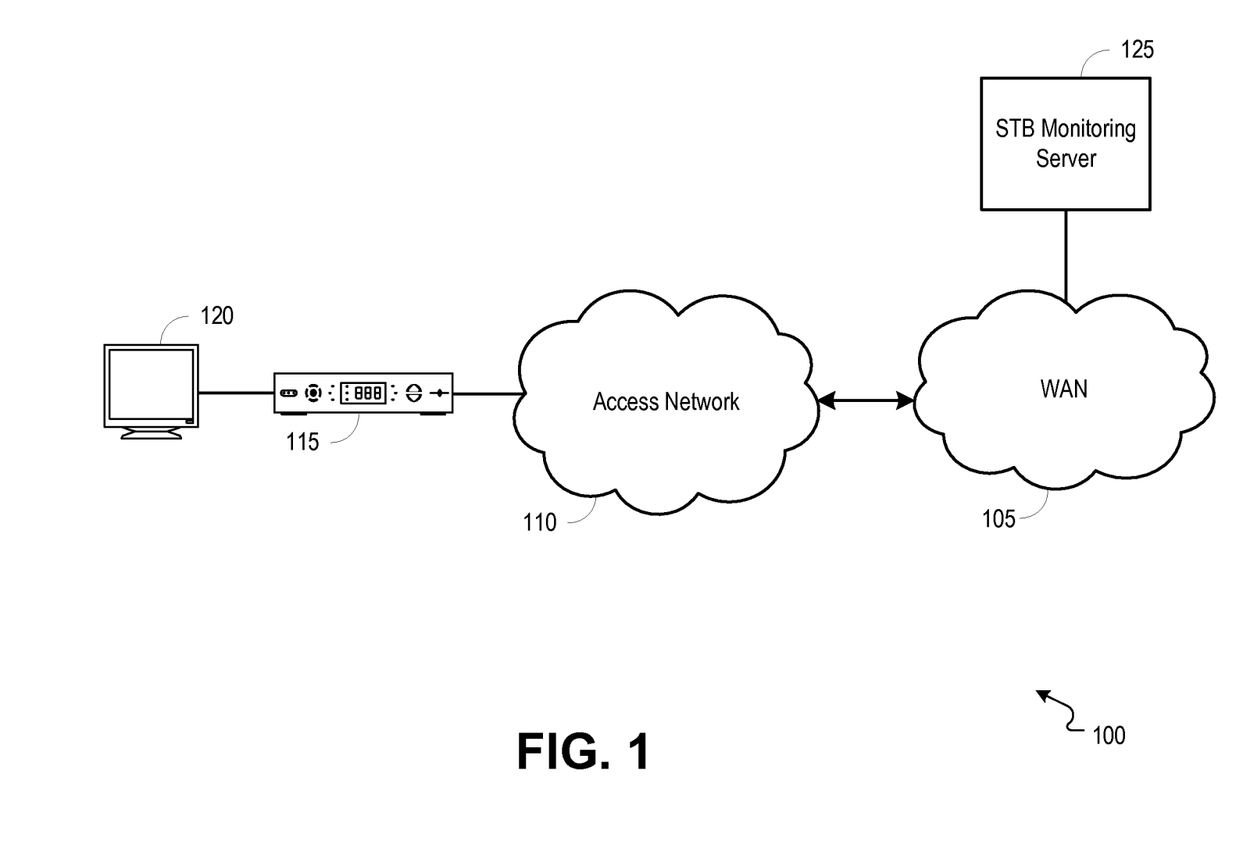
FIG. 1 is a block diagram illustrating an example network environment operable to monitor for and alert the occurrence of pre-failure indicators at a set-top box disk.

FIG. 1 is a block diagram illustrating an example network environment 100 operable to monitor for and alert the occurrence of pre-failure indicators at a set-top box disk. In embodiments, a customer premise equipment (CPE) device receives video service(s), data service(s), and/or voice service(s) from a wide area network (WAN) 105 through a connection to an access network 110 (e.g., hybrid fiber-coaxial (HFC) network, a local area network (LAN), a wireless local area network (WLAN), a cellular network, a personal area network (PAN), twisted pair network, high-speed mobile communications network, etc.). The CPE device can include, for example, a set-top box (STB) 115 or any other device operable to receive video services through an access network 110. The STB 115 may support digital video recorder (DVR) functions and may include a disk (e.g., hard disk drive (HDD)) for storing recorded multimedia content. The STB 115 may deliver stored or real-time multimedia content to a client device (e.g., display device 120 such as a television).

In embodiments, the disk associated with the STB 115 may become degraded through use. When the disk reaches a certain point of degradation, the subscriber may experience problems during playback of content that is recorded on the associated disk. In embodiments, the STB 115 may be configured to identify a degradation of the disk before the degradation reaches the point at which the subscriber begins to experience quality issues. The STB 115 may include self-monitoring technology (e.g., self-monitoring, analysis and reporting technology (S.M.A.R.T.)) operable to run tests and diagnostics on the components of the STB 115.

In embodiments, the STB 115 may periodically (e.g., such as when the STB 115 comes out of standby mode) run a self-monitoring test, and may interpret pre-failure attributes (e.g., read error, seek error, and reallocated sector counts) as identified by an associated self-monitoring technology. The STB 115 can then output an alert (e.g., at the television 120) informing the subscriber to contact a service provider or customer service representative if pre-failure of the STB disk is indicated. The subscriber may dismiss the displayed alert, and the pre-failure attributes may be posted to a remote diagnostics server. For example, the pre-failure attributes may be uploaded to a STB monitoring server 125.

In embodiments, tests conducted at the STB 115 may include vendor defined sector surface tests along with read, circuitry, and mechanical tests. Results may be returned as a self-test execution status byte and self-monitoring data sets (e.g., S.M.A.R.T. data sets) may be updated (e.g., where operating region is more than current usage region with respect to surface scans).

Critical disk errors (e.g., errors which are propagated upwards after retries) may be logged in the disk of the STB 115. These disk events are critical errors which occur during reading and writing of the recording/playback (e.g., DVR) process which does not succeed at low level retries and thus gets propagated up to a file system (e.g., designated as read/write/command/integrated drive electronics (IDE) errors). Disk events may also include driver buffer underflow/overflow interruptions, which indicate the read/write issues.

Compressed data buffer underflow/overflow interruptions can be logged. Buffer underflow/overflow interruptions may occur when read/write suffers at IDE level. These interruptions may be logged, and the STB 115 may output the log or may determine if there are any more events logged since the first event occurrence. Periodic occurrence can provide an indication of an issue (possibly leading to macro blocks or sluggishness).

A minimum performance test can be provided on the STB 115 for determining whether the disk performance meets a product supported use case. The minimum performance needed varies between different types of CPE devices. The STB 115 can provide a serial port command to execute a minimum performance test. When executed, this command can find out whether the disk is capable of handling a supported number of sessions (e.g., read/write sessions). For example, the supported number of sessions may be equivalent to the number of read and write operations that the STB 115 is configured to perform simultaneously. During testing, the STB 115 firmware can simulate the supported number of sessions and can determine whether the STB 115 completes the simulation without read/write errors. Critical errors observed during the simulation may be printed on a serial port rather than being logged to flash memory.

As one example of the above mentioned minimum performance test simulation, consider a STB 115 that is configured to perform up to five read operations and two write operations simultaneously. An expected or average bitrate per session may be provided or determined (e.g., 20 Mbps for each session). It should be understood that read and write sessions may be allocated different expected/average bitrates. A firmware load may also be factored in (say 30% for example). Thus the simulated bitrate in this example might be calculated as follows: 20 Mbps×5 read operations+ 20 Mbps×2 write operations+miniscule App usage+firmware load factor of 30% (~40 Mbps)=160 Mbps. According to this example, the STB disk may be tested at a simulated bitrate of 160 Mbps. For example, five read operations and two write operations may be performed across the disk. Reading and writing of the data may be handled in the disk itself, thus nothing is corrupted and the test is a non-destructive test. If the STB 115 passes the test, the determination may be made that the disk is sufficient for an advertised use case. Thus, the test can be unique to specific use cases associated with specific devices.

In embodiments, the test of the disk may focus on the file system or may span the entire disk to access a significant distribution of points throughout the disk, including repeated far reaching head seeks. Testing of the disk may be carried out through non-data-destructive testing. The total time taken to test the disk may be capped to a predetermined period of time (e.g., two to three minutes). Failure of the minimum performance test may cause an output of a notification indicating the need for the STB 115 or disk of the STB 115 to be replaced.

In embodiments, a maximum read and write throughput test in the STB 115 may be conducted periodically and may be carried out for a predetermined period of time. For example, after the completion of the predetermined period of time (e.g., one month, several months, one year, etc.), an average for said predetermined period of time may be determined for that period of time. If a subsequent performance figure is less than the previously determined figure by a predetermined amount (e.g., 15%-30%), or if a subsequent performance is less than a certain percentage of a previously determined figure (e.g., 20% of last year's average), then the disk may be flagged as trending bad. A typical maximum throughput for a STB may be used to determine an optimal drop for which to test.

The STB 115 may monitor the maximum session the STB 115 is subjected to in a given period of time (e.g., a month or a number of months), and a minimum performance test may be conducted according to the determined maximum session. Results of this minimum performance test may indicate a lack of adequate throughput for the typical use of the specific STB 115 tested. Results may be sent to a remote diagnostic server (e.g., STB monitoring server 125). The STB 115 may perform a maximum throughput test every month and may send the results to the remote diagnostic server. A multiple systems operator (MSO) server can trend the performance decline.

In embodiments, the STB 115 may be configured for testing at a repair center. The following test sequences and logs may be used in a repair center to diagnose and subsequently qualify a disk for DVR functionality for a particular STB 115. Data gathered by self-monitoring technology at the STB 115 can be analyzed. For example, a command can show current self-monitoring data and any failure data set (i.e., when first failed) and can indicate if the disk passes or fails the test. If the disk passes the self-monitoring test, then the following test may be executed. A short test can be conducted on the STB 115. This short test shows current short test data (e.g., specific attributes of a subset of self-test parameters) and any failure data set (i.e., when first failed)

and indicates if the disk passes or fails the test. If the disk passes the short test, then the following test may be executed. A test can be run to show a critical disk error log (e.g., log showing time of occurrence and cumulative number for each read/write error). If more than one event occurs after the first critical error, the determination may be made that the disk is trending toward failure or has already failed. If the event log does not indicate that the disk is failing or has failed, then the following test may be executed. A minimum and/or maximum performance test may be conducted, the output of which shows whether the disk meets performance criteria to provide a set top advertised use case. For example, the output may show whether the disk is sufficient for DVR functionality. Depending upon the set top supported use cases (read/write sessions) the repair personnel can trigger different tests.

In embodiments, the disk (e.g., HDD) of a STB 115 may have lost its peak or average performance, but it could still be sufficient for an advertised use case. One or more tests may be periodically conducted on the STB 115 to determine whether the product supported use case can be handled by the disk. For example, not every user needs the maximum session capability of a STB 115. A STB 115 may monitor the maximum session the STB is subjected to over a given period of time (e.g., a month) and conduct a minimum performance test as per the monitored maximum or average session. Also the results may be sent to a remote diagnostic server (e.g., STB monitoring server 125). As an example, one user may not use the STB for all five sessions, thus there is no need to test periodically if the disk is capable of handling five simultaneous sessions. The maximum or average sessions occurring in a month can be determined and used as the reference for a subsequent month. If a user only requires a maximum of two simultaneous sessions, the test can be tailored for only two sessions in a subsequent test. Over a given period, an average session test can be used. For example, after a certain number of STB disk use samples have been taken (e.g., after 5-10 samples), an average can be taken, and the subsequent testing of the STB disk can be tailored to test the ability of the STB disk to handle the determined average number of read/write operations or sessions. Therefore, the test can be based upon the specific use of a specific device by a specific user.

Figure 2:
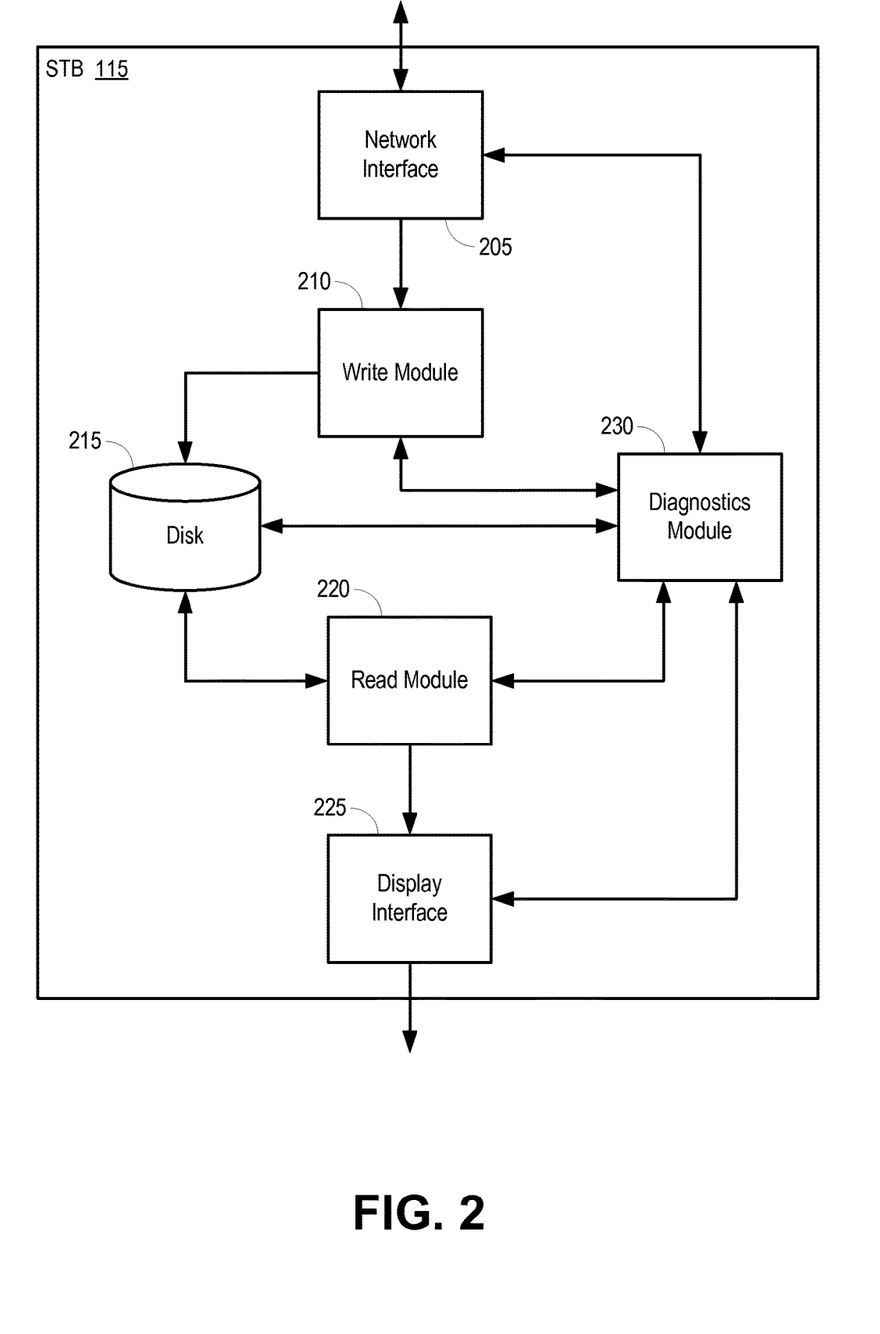
FIG. 2 is a block diagram illustrating an example set-top box operable to facilitate the monitoring of an associated disk for pre-failure indicators.

FIG. 2 is a block diagram illustrating an example STB 115 operable to facilitate the monitoring of an associated disk for pre-failure indicators. In embodiments, the STB 115 may include a network interface 205, a write module 210, a disk 215, a read module 220, a display interface 225, and a diagnostics module 230.

In embodiments, multiple services (e.g., video, voice, data, etc.) may be received at the STB 115 through a network interface 205. It should be understood that various types of video services may be delivered to the STB 115 including, but not limited to, linear content, recorded content, video-on-demand (VoD) content, and others.

Multimedia content received through the network interface 205 may be output to a display device (e.g., display device 120 of FIG. 1) and/or may be recorded at the STB 115. In embodiments, the write module 210 may receive multimedia content and write the multimedia content to a disk 215. The write module 210 may prepare packets associated with a received multimedia stream and may output the packets to a write buffer. The packets may be queued at the write buffer before being written to the disk 215.

In embodiments, the read module 220 may read data packets associated with a multimedia stream from the disk 215 and package the data packets for output to a display device (e.g., display device 120 of FIG. 1) through the display interface 225. Packets may be read from the disk 215 and may be queued in a read buffer before being output to a display device 120.

In embodiments, the diagnostics module 230 may monitor various components of the STB 115 (e.g., write module 210, disk 215, read module 220, display interface 225, etc.) for indicators of a potential failure of the disk 215. The diagnostics module 230 may initiate and run tests on the disk 215 to determine the health of the disk 215. For example, the diagnostics module 230 may carry out a self-monitoring test (e.g., S.M.A.R.T.), a short test (e.g., a test of only a subset of pre-failure indicating attributes), and/or a minimum/maximum performance test (e.g., subjective test based on capabilities of the STB 115) on the disk 215. The diagnostics module 230 may monitor various components of the STB 115 for critical error events (e.g., error occurring during a read or write operation that is propagated upwards after a retry), and may log each critical error event.

In embodiments, the diagnostics module 230 may make a determination as to the health of the disk 215 based on the results of tests run on the disk 215, observed critical error events, and other pre-failure indicators. If the determination is made that the health of the disk 215 has degraded to a certain level at which it may be necessary to replace the disk 215, the diagnostics module 230 may output a notification to a user or technician that the disk 215 or the STB 115 should be replaced. The notification may be output to a display device 120 of FIG. 1 through the display interface 225 or may be output to a remote server (e.g., STB monitoring server 125 of FIG. 1) through the network interface 205. The notification may include results obtained from one or more tests conducted on the disk 215 and/or logs including critical error events occurring at the STB 115 over a period of time.

In embodiments, the diagnostics module 230 may output test results, critical error event logs, and other pre-failure indicators to a remote server (e.g., STB monitoring server 125). The remote server may determine that the STB 115 or disk 215 is need of replacing based on the information received from the STB 115.

Figure 3:
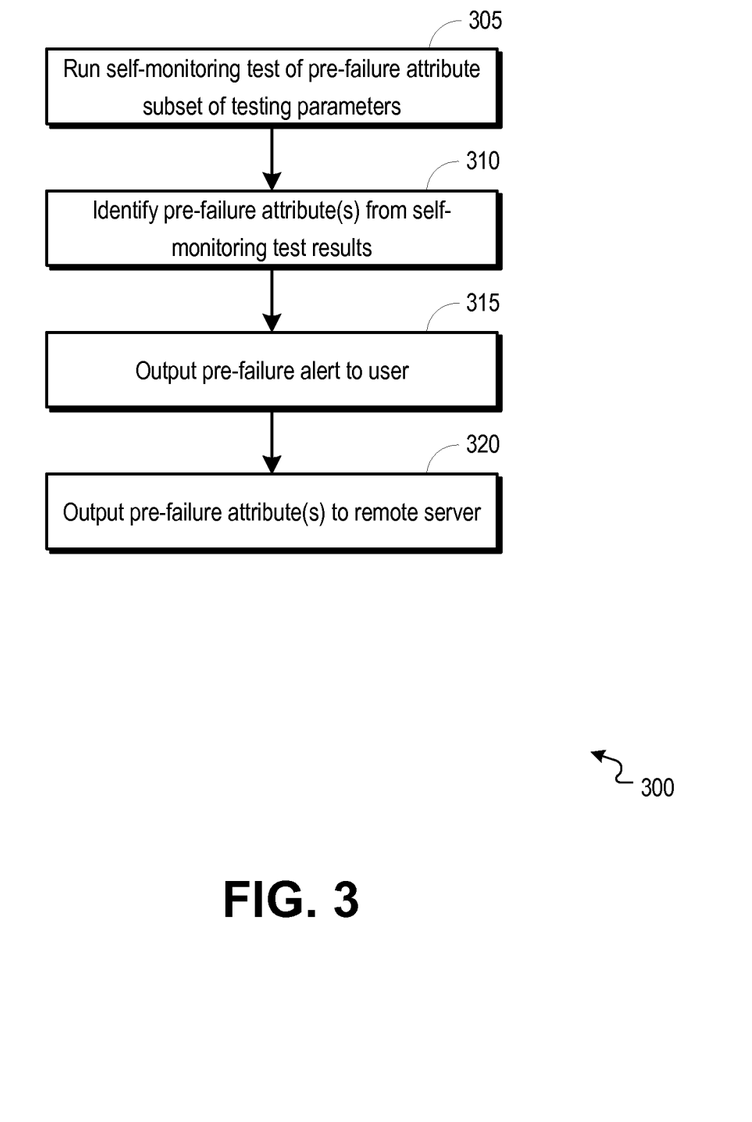
FIG. 3 is a flowchart illustrating an example process operable to facilitate the monitoring of self-monitoring test results for pre-failure indicators.

FIG. 3 is a flowchart illustrating an example process 300 operable to facilitate the monitoring of self-monitoring test results for pre-failure indicators. The process 300 may begin at 305 when a self-monitoring test is initiated and run at a STB 115 of FIG. 1. The self-monitoring test may be initiated and run, for example, by a diagnostics module 230 of FIG. 2. The self-monitoring test may be run periodically or conditionally at the STB 115. For example, the self-monitoring test may be run after each reboot of the STB 115 or each time the STB 115 exits a standby mode.

In embodiments, the self-monitoring test may be a limited test wherein only a subset of parameters are tested. For example, the self-monitoring test may be a limited testing of the STB 115 for indicators of a potential failure of a disk (e.g., disk 215 of FIG. 2), wherein only a subset of self-monitoring (e.g., self-monitoring, analysis and reporting technology (S.M.A.R.T.)) attributes are tested. The tested STB 115 attributes may include those tests associated with a pre-failure attribute subset of parameters. For example, the pre-failure attribute subset may include read error, seek error, and reallocated sector count attributes.

At 310, pre-failure attribute(s) may be identified from results of the self-monitoring test. Pre-failure attribute(s) may be identified, for example, by a diagnostics module 230 of FIG. 2. In embodiments, the diagnostics module 230 may review the self-monitoring test results for attribute metrics that provide an indication of a potential disk failure. For example, the diagnostics module 230 may identify any measurement of pre-failure attributes (e.g., read errors, seek errors, or reallocated sector counts) that is higher than a corresponding raw value (e.g., threshold level associated with an attribute).

At 315, a pre-failure alert may be output to a user. A pre-failure alert may be output by a diagnostics module 230 of FIG. 2 to a display device (e.g., display device 120 of FIG. 1) through a display interface 225 of FIG. 2. In embodiments, the pre-failure alert may be output to the display device as a graphical user interface (GUI) or textual user interface (TUI) and may provide a notification to a user of the pre-failure indicators discovered during the self-monitoring test of the STB 115. Once displayed to a user, the user may dismiss the pre-failure alert.

At 320, identified pre-failure attributes may be output to a remote server. Pre-failure attributes may be output, for example, from the diagnostics module 230 of FIG. 2 to a STB monitoring server 125 of FIG. 1 through a network interface 205 of FIG. 2. Measured pre-failure attributes (e.g., read error, seek error, and reallocated sector counts) of the self-monitoring test may be output to and stored at the STB monitoring server 125. It should be understood, that all measured pre-failure attributes, or only those pre-failure attribute measurements indicating disk failure (e.g., attribute measurements that are higher than a corresponding attribute raw value), may be output to the STB monitoring server 125.

Figure 4:
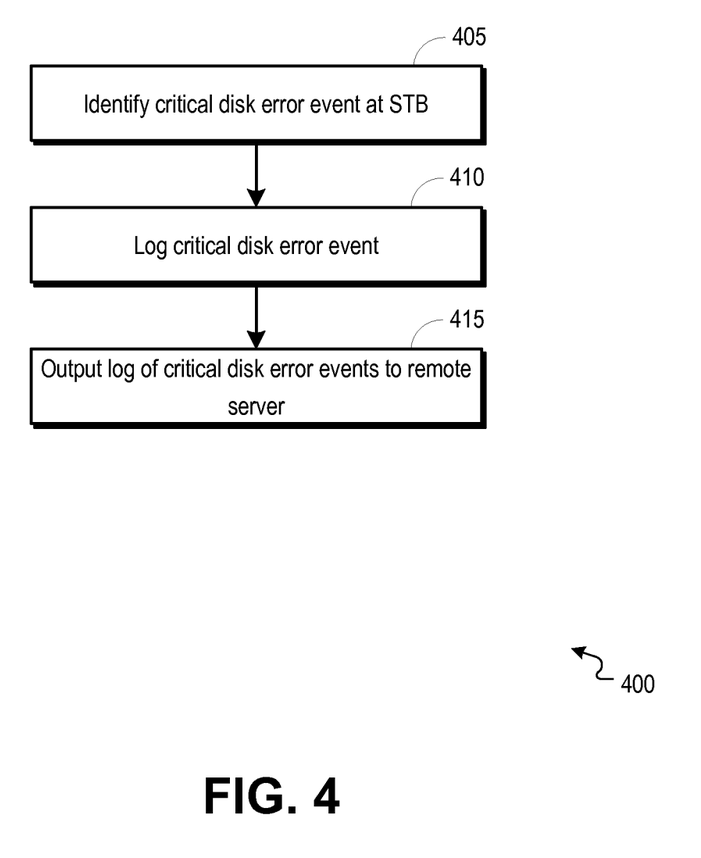
FIG. 4 is a flowchart illustrating an example process operable to facilitate the monitoring of disk error events for pre-failure indicators.

FIG. 4 is a flowchart illustrating an example process 400 operable to facilitate the monitoring of disk error events for pre-failure indicators. The process 400 may begin at 405 when the occurrence of a critical disk error is identified at a STB (e.g., STB 115 of FIG. 1). In embodiments, a critical disk error may include an error that occurs during a reading from or writing to a disk (e.g., disk 215 of FIG. 2), wherein the read/write operation fails at a low level and is propagated up to a file system (e.g., read errors, write errors, command errors, integrated drive electronics (IDE) errors, etc.). For example, a critical disk error may include an error that occurs at the STB 115 during a digital video recorder (DVR) operation (e.g., recording or playback). A critical disk error may include an error at a driver buffer (e.g., underflow/overflow interruption).

At 410, the identified critical disk error event may be logged. The critical disk error event may be logged, for example, by the disk 215 of FIG. 2 or by a diagnostics module 230 of FIG. 2. In embodiments, the time of occurrence of the critical disk error event may be logged along with an identification of the type of critical error and may be stored within a log of critical disk error events at the STB 115.

At 415, a log of critical disk error events, including the identified critical disk error event may be output from the STB 115 to a remote server. In embodiments, the log may include an identification of each critical disk error event that occurred at the STB 115 over a certain period of time, and for each critical disk error event, the log may include an identification of the type of disk error and a time of occurrence. The log of critical disk error events may be output from the STB 115 to a STB monitoring server 125 of FIG. 1.

Figure 5:
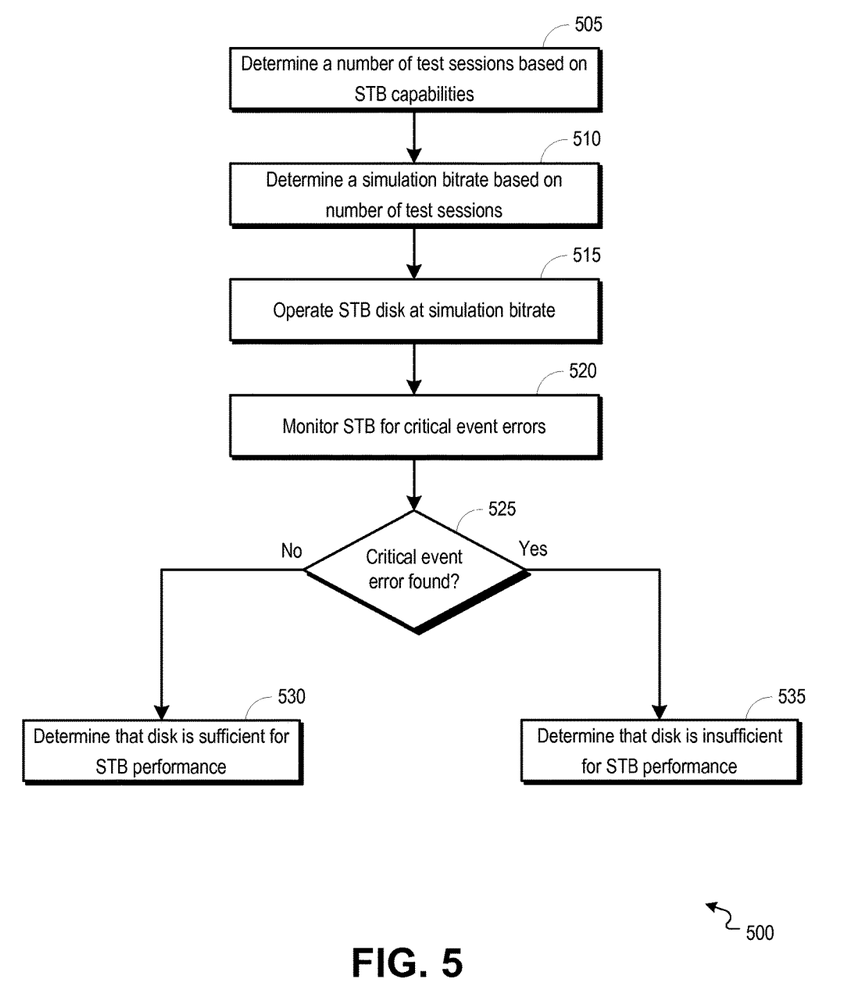
FIG. 5 is a flowchart illustrating an example process operable to facilitate the testing of a set-top box disk based upon a capability of the set-top box.

FIG. 5 is a flowchart illustrating an example process 500 operable to facilitate the testing of a STB disk based upon a capability or use of the STB. The process 500 may begin at 505 when a number of test sessions (e.g., simulation operations) is determined based upon capabilities of a STB 115 of FIG. 1. The number of test sessions may be determined, for example, by a diagnostics module 230 of FIG. 2, by a remote server (e.g., STB monitoring server 125 of FIG. 1), or by manual user input at the STB 115. In embodiments, the number of test sessions may be based upon the capability of the STB 115 to read and/or write to a disk (e.g., disk 215 of FIG. 2). For example, the number of test sessions may be equivalent to the number of read and/or write operations that may be simultaneously performed by the STB 115 on a disk 215 (e.g., for a STB 115 capable of five reads and two writes, the number of test sessions would be 7). The number of test sessions may be equivalent to an observed maximum number of read/write sessions or average number of read/write sessions occurring simultaneously at the STB 115 during a predetermined period of time.

At 510, a simulation bitrate may be determined based upon the number of test sessions. In embodiments, the simulation bitrate may be an average or anticipated bitrate required by the STB 115 to carry out the determined number of test sessions simultaneously. For example, an average bitrate per session may be used to determine the total bitrate required for the STB 115 to simultaneously perform the maximum number of reads and maximum number of writes on the disk 215 (e.g., say the average bitrate for a session is 20 Mbps, then for a total of 7 simultaneous sessions, the required bitrate would be (7×20 Mbps) 140 Mbps). It should be understood that different average bitrates may be used for different types of operations. For example, different average bitrates may be applied to read operations and write operations in determining the simulation bitrate.

At 515, the STB disk may be operated on at the simulation bitrate. In embodiments, test operations may be performed on the disk 215 of FIG. 2, wherein the test operations simulate a performance of the determined number of sessions (e.g., read/write sessions) on the disk 215. For example, the test operations may include read and write operations made to the disk 215, and may test the ability of the disk 215 to handle operations performed at the simulation bitrate. The test operations may be performed across the entire disk 215. For example, test operations may be made to a significant distribution of points throughout the disk 215, including repeated, far-reaching head seeks. The operation of the disk 215 at the simulation bitrate may be carried out through non-data-destructive testing. The disk test may include a plurality of read/write operations carried out through the sectors of the disk 215 such that a minimum to a maximum number of head seeks is tested.

At 520, the STB 115 may be monitored for critical event errors. While performing test operations on the disk 215, a diagnostics module 230 may monitor various components of the STB 115 (e.g., write module 210 of FIG. 2, disk 215 of FIG. 2, read module 220 of FIG. 2, etc.) for critical event errors. A critical event error may be an error occurring during a read or write operation that is propagated upwards after a retry.

At 525, a determination may be made whether a critical event error was found during the operation of the STB disk at the simulation bitrate. In embodiments, a critical event error that occurs during the operation of the STB disk at the simulation bitrate may be logged by the diagnostics module 230 or may be printed at a serial port.

If, at 525, the determination is made that no critical error was found during the operation of the STB disk at the simulation bitrate, the process 500 may proceed to 530. At 530, the determination may be made that the disk 215 is sufficient for an expected/anticipated use of the associated STB 115. For example, the determination may be made that the disk 215 is capable of performing the number of read/write operations for which the simulation bitrate was determined.

If, at 525, the determination is made that one or more critical event errors were found during the operation of the STB disk at the simulation bitrate, the process 500 may proceed to 535. At 535, the determination may be made that the disk 215 is insufficient for an expected/anticipated use of the associated STB 115. For example, the determination may be made that the disk 215 is not capable of performing the number of read/write operations for which the simulation bitrate was determined without encountering critical error(s). In embodiments, a notification may be output to a display (e.g., display device 120 of FIG. 1) or remote server (e.g., STB monitoring server 125 of FIG. 1) informing a user or technician of the critical error(s) encountered during testing of the disk 215. For example, the notification may inform the user or technician that the disk 215 or STB 115 should be replaced.

Figure 6:
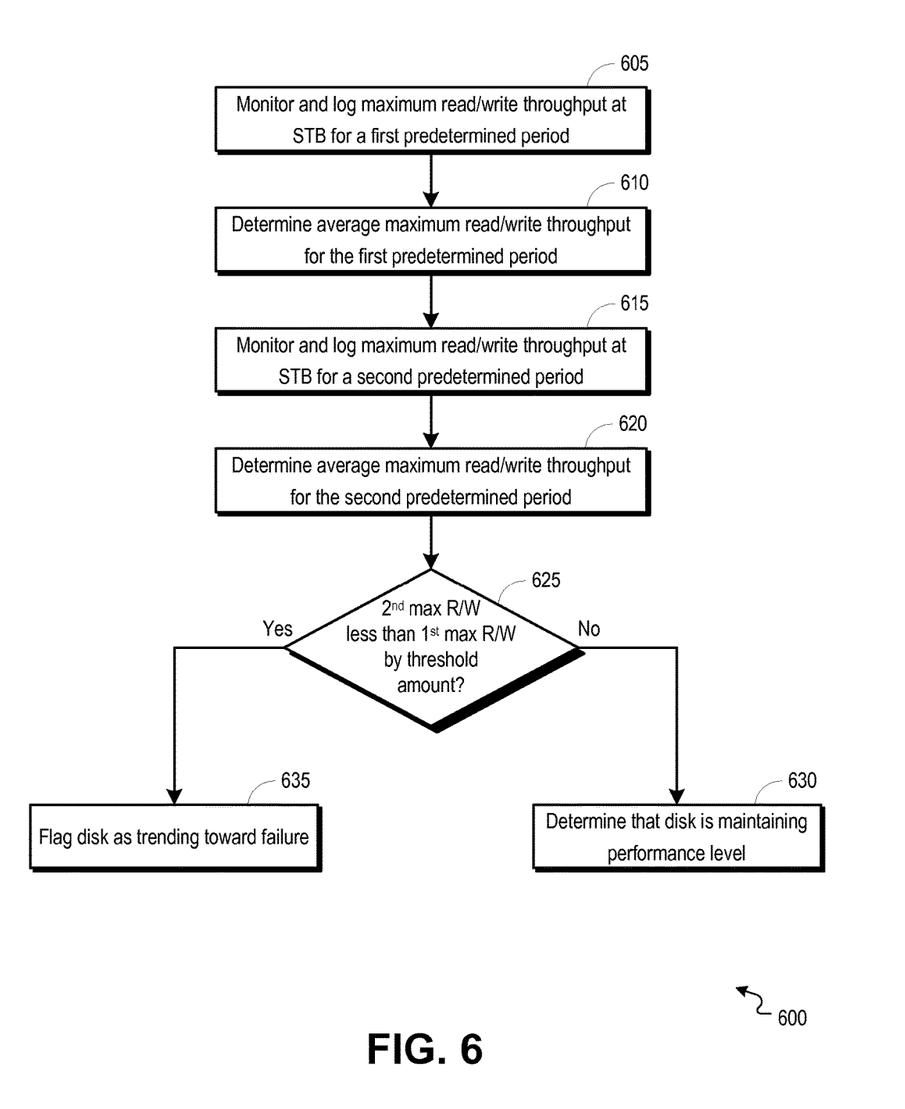
FIG. 6 is a flowchart illustrating an example process operable to facilitate the testing of a set-top box disk based upon an observed read/write throughput at the set-top box.

FIG. 6 is a flowchart illustrating an example process 600 operable to facilitate the testing of a STB disk based upon an observed read/write throughput at the STB. The process 600 may begin at 605 where the maximum read/write throughput (e.g., read/write throughput observed when a disk is performing all processing stages of a read/write operation) at a STB 115 of FIG. 1 is monitored for a first predetermined period of time. In embodiments, the maximum read/write throughput at the STB 115 may be periodically measured over a predetermined period of time (e.g., one month, six months, 12 months, etc.) and the measurements may be logged, for example, at a diagnostics module 230 of FIG. 2 or may be output to a remote server (e.g., STB monitoring server 125 of FIG. 1).

At 610, an average maximum read/write throughput may be determined for the first predetermined period. In embodiments, the average maximum read/write throughput for the first predetermined period may be based on the maximum read/write throughput measurements made during the first predetermined period. The average maximum read/write throughput may be determined, for example, by the diagnostics module 230 of FIG. 2 or the STB monitoring server 125 of FIG. 1. The average maximum read/write throughput may be stored at the diagnostics module 230 or the STB monitoring server 125 of FIG. 1.

At 615, the maximum read/write throughput at the STB 115 may be monitored for a second predetermined period of time. In embodiments, the maximum read/write throughput at the STB 115 may be periodically measured over a predetermined period of time (e.g., one month, six months, 12 months, etc.) and the measurements may be logged, for example, at a diagnostics module 230 of FIG. 2 or may be output to a remote server (e.g., STB monitoring server 125 of FIG. 1). The second predetermined period of time may be a period of time that is subsequent to the first predetermined period of time, and may be of the same duration or a different duration than the first predetermined period of time.

At 620, an average maximum read/write throughput may be determined for the second predetermined period. In embodiments, the average maximum read/write throughput for the second predetermined period may be based on the maximum read/write throughput measurements made during the second predetermined period. The average maximum read/write throughput may be determined, for example, by the diagnostics module 230 of FIG. 2 or the STB monitoring server 125 of FIG. 1. The average maximum read/write throughput may be stored at the diagnostics module 230 or the STB monitoring server 125 of FIG. 1.

At 625, the determination may be made whether the average maximum read/write throughput of the second predetermined period is less than the average maximum read/write throughput of the first predetermined period by a threshold difference. The average maximum read/write throughput of the second predetermined period may be compared to the average maximum read/write throughput of the first predetermined period, for example, by the diagnostics module 230 of FIG. 2 or the STB monitoring server 125 of FIG. 1. In embodiments, the threshold difference may be based on a difference in maximum read/write throughputs that may provide an indication of a failing disk 215 of FIG. 2. The threshold difference may be small enough to indicate a significant difference between measured throughputs and may be large enough to avoid a pre-failure alert when only a small (insignificant) difference is realized. For example, the predetermined threshold amount may be set between 10% and 30% of the average maximum read/write throughput of the first predetermined period.

If, at 625, the determination is made that the average maximum read/write throughput of the second predetermined period is not less than the average maximum read/write throughput of the first predetermined period by a threshold difference, the process 600 may proceed to 630. At 630, the determination may be made that a disk 215 associated with the STB 115 is maintaining a level of performance.

If, at 625, the determination is made that the average maximum read/write throughput of the second predetermined period is less than the average maximum read/write throughput of the first predetermined period by a threshold difference, the process 600 may proceed to 635. At 635, the determination may be made that a level of performance of a disk 215 associated with the STB 115 is degrading, and the disk 215 may be flagged as trending towards failure. The disk 215 may be flagged as trending towards failure by the diagnostics module 230 of FIG. 2 or the STB monitoring server 125 of FIG. 1. In embodiments, a notification may be output to a display (e.g., display device 120 of FIG. 1) or remote server (e.g., STB monitoring server 125 of FIG. 1) informing a user or technician of the degradation in throughput at the disk 215. For example, the notification may inform the user or technician that the disk 215 or STB 115 should be replaced.

Figure 7:
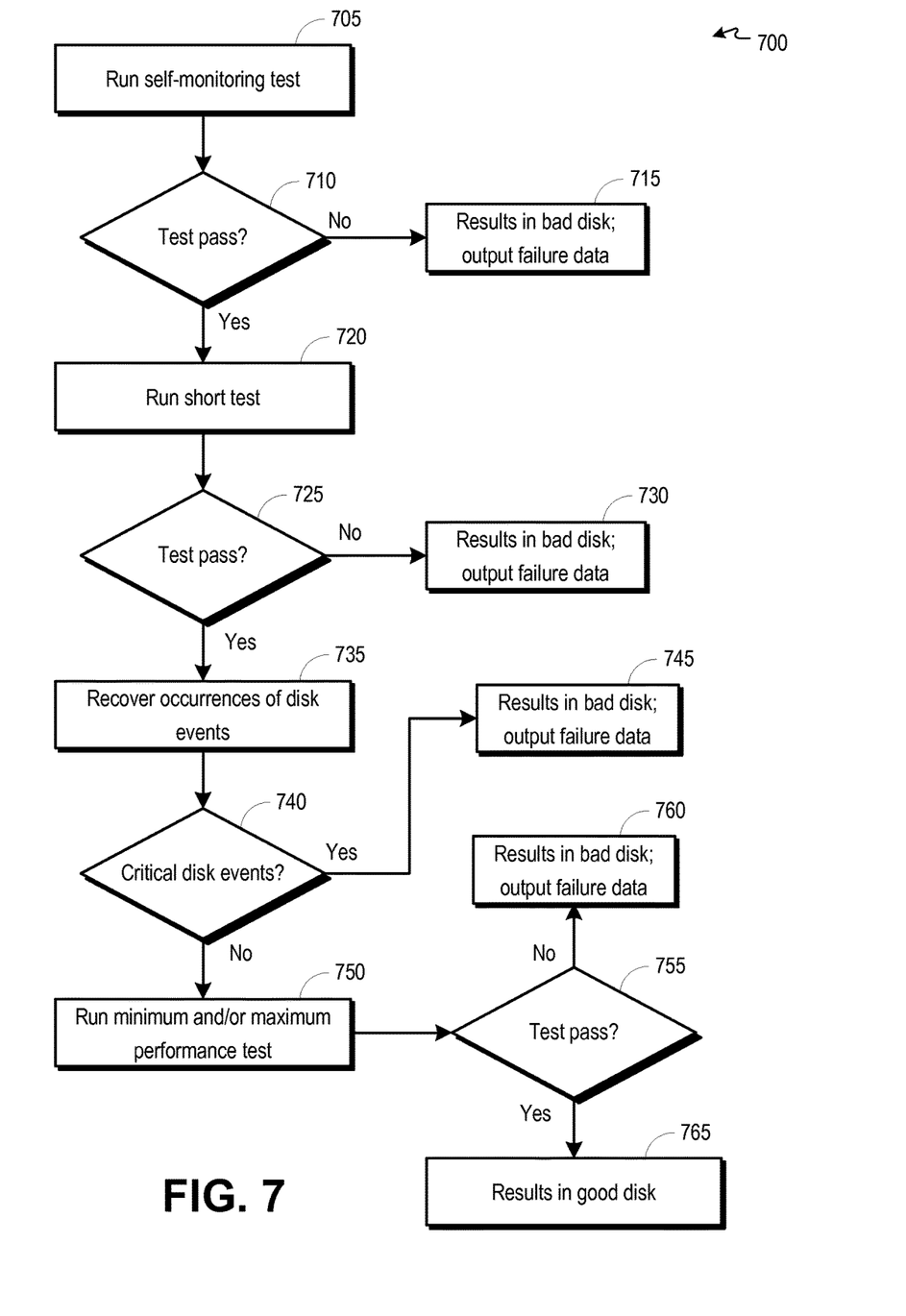
FIG. 7 is a flowchart illustrating an example process operable to facilitate testing of a set-top box disk based on a hierarchical sequence of diagnostic tests.

FIG. 7 is a flowchart illustrating an example process 700 operable to facilitate testing of a STB disk based on a hierarchical sequence of diagnostic tests. The process 700 can be conducted on a STB 115 of FIG. 1, for example, by service personnel testing the functionality of a disk (e.g., disk 215 of FIG. 2) associated with the STB 115. The process 700 may begin at 705, where data gathered during a self-monitoring test (e.g., test conducted at the STB 115 by self-monitoring, analysis and reporting technology (S.M.A.R.T.)) may be analyzed. Self-monitoring test results may be analyzed, for example, by a diagnostics module 230 of FIG. 2. A command may be used to show current self-monitoring data and any failure data set (when first failed), and the data may indicate whether the disk 215 has passed or failed the self-monitoring test.

At 710, the determination may be made whether the STB 115 has passed the self-monitoring test. The determination whether the STB 115 has passed the self-monitoring test may be made, for example, by a diagnostics module 230 of FIG. 2 or a remote server (e.g., STB monitoring server 125 of FIG. 1). If the STB 115 fails the self-monitoring test, the process 700 may proceed to 715 where the determination is made that the disk 215 is bad. Data indicating the failed test may be output to a display for review by a user or technician.

If, at 710, the STB 115 passes the self-monitoring test, then the process may proceed to 720. At 720, a short test may be conducted on the STB 115. In embodiments, a short test may include a test of certain attributes of a self-monitoring test (e.g., a pre-failure subset of self-monitoring test attributes). Results of the short test may provide current short test data (e.g., subset of self-monitoring test attributes) and any failure data set (when first failed). The subset of self-monitoring tests may include one or more specific tests that may serve to predict a disk failure (e.g., a first scan error may provide a high probability of an imminent failure).

At 725, the determination may be made whether the STB 115 has passed or failed the short test. The determination whether the STB 115 has passed or failed the short test may be based upon results of the short test and may be made, for example, by a diagnostics module 230 of FIG. 2 or a remote server (e.g., STB monitoring server 125 of FIG. 1). If the STB 115 fails the short test, the process 700 may proceed to 730 where the determination is made that the disk 215 is bad. Data indicating the failed test may be output to a display for review by a user or technician.

If, at 725, the STB 115 passes the short test, the process 700 may proceed to 735. At 735, a critical disk error log (e.g., a log including the time of occurrence(s) and cumulative number of critical errors such as read errors, write errors, and IDE events) may be reviewed.

At 740, a determination may be made whether the STB 115 has failed or is failing based upon the presence of critical disk errors in the disk event log. In embodiments, the occurrence of a certain number of critical error events at the STB 115 or the occurrence of a certain number of critical error events at the STB 115 within a certain duration of time may indicate that the disk 215 associated with the STB 115 is bad and that the disk 215 or STB 115 should be replaced. For example, if more than one critical error event is logged after a first critical error event is logged, then the determination may be made that the disk 215 is trending toward failure or has already failed.

If, at 740, critical error events found in the disk event log indicate a failing or failed disk 215 (i.e., if more than one event is logged), the process 700 may proceed to 745. At 745, the determination may be made that the disk 215 is trending toward failure or has already failed. Data indicating the critical error events may be output to a display for review by a user or technician.

If, at 740, the determination is made that critical error events do not indicate a failing or failed disk 215, the process 700 may proceed to 750. At 750, a minimum and/or maximum performance test may be conducted, the output of which shows whether the disk meets performance expectations/requirements to support advertised use cases. For example, the output of the minimum and/or maximum performance test may provide an indication whether the disk 215 is capable of supporting a certain number of read and write operations association with digital video recorder (DVR) functionality (e.g., a certain number of read and write operations that the STB 115 is configured to perform simultaneously), or may indicate a failing disk 215 based on a drop in average maximum throughput at the STB 115.

At 755, the determination may be made whether the STB 115 passes the minimum/maximum performance test. If the results of the minimum/maximum performance test indicate that the disk 215 is not capable of supporting the certain number of read and write operations (e.g., if one or more critical errors occur during a simulation of the certain number of read and write operations), then the process 700 may proceed to 760 where the determination is made that the disk 215 is bad. Data indicating the failed test may be output to a display for review by a user or technician.

If, at 755, the determination is made that the results of the minimum/maximum performance test do not indicate an inability to handle the certain number of read/write operations, then the process 700 may proceed to 765. At 765 the determination may be made that the disk 215 of the STB 115 is in an acceptable condition for an intended use (e.g., DVR functionality).

Figure 8:
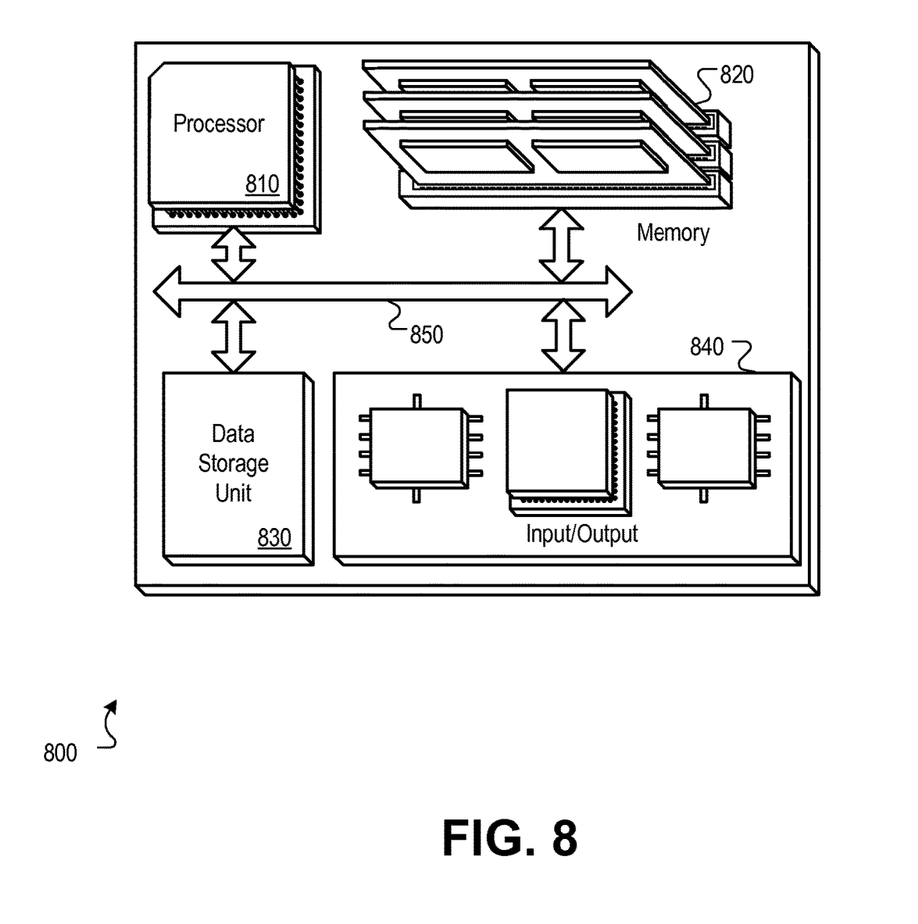
FIG. 8 is a block diagram of a hardware configuration operable to monitor for and alert the occurrence of a pre-failure indicators at a set-top box disk.

FIG. 8 is a block diagram of a hardware configuration 800 operable to monitor for and alert the occurrence of a pre-failure indicators at a STB disk. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In one implementation, the input/output device 840 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., access network 110 of FIG. 1, WAN 105 of FIG. 1, etc.).

Those skilled in the art will appreciate that the invention improves upon methods and apparatuses for detecting a potential STB disk failure. Methods, systems, and computer readable media can be operable to monitor for and alert the occurrence of pre-failure indicators at a set-top box (STB) disk. Results of self-monitoring tests, short tests, and maximum/minimum performance tests may be used to identify the potential for a STB disk failure. Moreover, critical error events at the STB may be logged, and the health of the STB disk may be determined based on the logged critical error events. Test results and critical error event logs may be used to predict an impending failure of a STB disk, and a notification may be output to a user or technician indicating the potential need to replace the STB or STB disk.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   determining a number of simulation operations to perform on a set-top box disk, wherein the number of simulation operations is based on one or more capabilities of the set-top box disk;
   determining a bitrate at which to perform each of the simulation operations, wherein the bitrate at which to perform each of the simulation operations is based on one or more capabilities of the set-top box disk;
   performing the simulation operations on the set-top box disk at the determined bitrate;
   monitoring one or more components of a set-top box associated with the set-top box disk for critical errors; and
   if one or more critical errors are observed at the set-top box while the simulation operations are being performed on the set-top box disk, outputting a notification indicating the need for replacement of the set-top box disk.

2. The method of claim 1, wherein the number of simulation operations performed on the set-top box disk is based on the number of read operations and write operations for which the set-top box disk is configured to simultaneously perform.

3. The method of claim 1, further comprising:
   determining a maximum number of simultaneous read operations and write operations that are performed on the set-top box disk over a certain period of time; and
   wherein the number of simulation operations performed on the set-top box disk is based on the determined maximum number of simultaneous read operations and write operations performed on the set-top box disk over the certain period of time.

4. The method of claim 1, further comprising:
   determining an average number of simultaneous read operations and write operations that are performed on the set-top box disk over a certain period of time; and wherein the number of simulation operations performed on the set-top box disk is based on the determined average number of simultaneous read operations and write operations performed on the set-top box disk over the certain period of time.

5. The method of claim 1, wherein the bitrate at which each respective simulation operation is performed on the set-top box disk is based on an average bitrate associated with read or write operations.

6. The method of claim 1, wherein the simulation operations are performed at a significant distribution of points throughout the set-top box disk.

7. The method of claim 1, wherein the simulation operations are performed on the set-top box disk using non-data-destructive testing.

8. The method of claim 1, wherein the notification comprises a log of the identified critical errors, and wherein the notification is output from the set-top box to a remote server.

9. The method of claim 1, wherein one or more observed critical errors comprise buffer interruptions.

10. An apparatus comprising:
a module that:
determines a number of simulation operations to perform on a disk, wherein the number of simulation operations is based on read and write capabilities of the disk;
determines a bitrate at which to perform each of the simulation operations;
performs the simulation operations on the disk at the determined bitrate; and
monitors the disk for critical errors; and
an interface that outputs a notification indicating the need for replacement of the disk if one or more critical errors are observed while the simulation operations are being performed on the disk.

11. The apparatus of claim 10, wherein the number of simulation operations performed on the disk is based on the number of read operations and write operations for which the disk is configured to simultaneously perform.

12. The apparatus of claim 10, wherein the module further:
determines a maximum number of simultaneous read operations and write operations that are performed on the disk over a certain period of time; and
wherein the number of simulation operations performed on the disk is based on the determined maximum number of simultaneous read operations and write operations performed on the disk over the certain period of time.

13. The apparatus of claim 10, wherein the module further:
determines an average number of simultaneous read operations and write operations that are performed on the disk over a certain period of time; and
wherein the number of simulation operations performed on the disk is based on the determined average number of simultaneous read operations and write operations performed on the disk over the certain period of time.

14. The apparatus of claim 10, wherein the simulation operations are performed at a significant distribution of points throughout the disk.

15. The apparatus of claim 10, wherein the notification comprises a log of the identified critical errors, and wherein the notification is output to a remote server.

16. The apparatus of claim 10, wherein the simulation operations are performed on the disk using non-data-destructive testing.

17. A method comprising:
running one or more self-monitoring tests on a set-top box disk;
logging the occurrence of critical disk errors at the set-top box disk;
running one or more use-case specific tests on the set-top box disk, wherein the one or more use-case specific tests are based on a use of the set-top box; and
based on the results of the self-monitoring tests, the occurrence of critical disk errors, and the results of the one or more use-case specific tests, outputting a notification indicating the need for replacement of the set-top box disk;
monitoring throughput at the set-top box disk for a first predetermined period;
determining an average throughput for the first predetermined period;
monitoring throughput at the set-top box disk for a second predetermined period;
determining an average throughput for the second predetermined period; and
if the average throughput for the second predetermined period is less than the average throughput for the first predetermined period by a predetermined threshold, outputting a notification identifying the set-top box disk as a disk that is trending toward a failure.

18. The method of claim 17, wherein the average throughput for the first predetermined period and the average throughput for the second predetermined period comprises the average maximum throughput observed during each respective period.

19. The method of claim 17, wherein the first predetermined period and the second predetermined period are of equivalent durations.

* * * * *